(12) United States Patent
Wang et al.

(10) Patent No.: US 7,455,372 B2
(45) Date of Patent: Nov. 25, 2008

(54) SAFETY ANGLE COCK

(75) Inventors: Yidong Wang, No. 4-1, No. 2 Building, Chaoyang Zone, Zhang Nan Road, Nan Ding Town, Zhang Dian District, Zi Bo, Shan Dong (CN); Shicheng Wang, Shan Dong (CN)

(73) Assignee: Yidong Wang, Zibo (CN)

( * ) Notice: Subject to any disclaimer, the term of this patent is extended or adjusted under 35 U.S.C. 154(b) by 459 days.

(21) Appl. No.: 11/267,862

(22) Filed: Nov. 4, 2005

(65) Prior Publication Data
US 2006/0255655 A1   Nov. 16, 2006

(30) Foreign Application Priority Data
May 12, 2005   (CN) .................. 2005 1 0072445

(51) Int. Cl.
*B60T 15/04* (2006.01)
*F16K 5/08* (2006.01)
(52) U.S. Cl. ................ 303/56; 251/314; 251/315.16
(58) Field of Classification Search .................. 303/50, 303/56, 68, 70, 86; 251/309, 312, 314, 315.01, 251/315.08, 315.09, 304, 310, 311, 315.1, 251/315.06, 315.16
See application file for complete search history.

(56) References Cited
U.S. PATENT DOCUMENTS
3,674,052 A * 7/1972 Hartman et al. ........ 251/315.16
4,132,388 A * 1/1979 Billeter .................. 251/312
5,664,447 A * 9/1997 Neeley .................... 70/175
5,732,739 A * 3/1998 Ota ....................... 251/214

FOREIGN PATENT DOCUMENTS
CN   93214462.4   6/1995
CN   96115748.8   5/2001

* cited by examiner

*Primary Examiner*—Thomas J Williams
(74) *Attorney, Agent, or Firm*—Workman Nydegger

(57) ABSTRACT

A safety angle cock air-bleeding in a multi-mode and having a ball core revolved in a single direction is of switch valves used in a train air brake system. The safety angle cock includes a cock body with a casing, a shaft, a main pipe joint and a hose joint with a locking nose, wherein there is on a upper part of the casing of the cock body a limit stop with a handle mount, a pallet and a ratchet wheel are disposed in the handle mount for controlling rotation of the shaft in a single direction, a small sealing ring is arranged at a hose connection port of the cock body and a large sealing ring at a main pipe connection port of the cock body, and a ball core positioned in the cock body is connected to the lower end of the shaft and provided with a air bleeding slot on each side thereof, the length of the slot being bigger than the diameter of the small sealing ring and smaller than the diameter of the big sealing ring, characterized in that an air bleeding valve for adjusting and controlling air-bleed is mounted at a bottom of the casing of the cock body. The invention adopts multi-level automatic protection technology and can thereby achieve such favorable effects as guaranteeing the safe of train, improving the safe operation level, ameliorating the operating mode, freeing the product from regular maintenance, and lowering the production and application cost.

13 Claims, 5 Drawing Sheets

SAFETY ANGLE COCK

FIELD OF THE INVENTION

This invention relates to a switch valve used in pneumatic transmission pipes, particularly to a switch valve applicable to air brake facilities of the train.

BACKGROUND OF THE RELATED ART

It's widely known that brake plays an important role in insuring safety in railway transportation. Brake of train in countries worldwide basically adopts air brake facilities, and the brake air is put through by pneumatic pipes installed on the train. An angle cock serves as an important part on a main brake pipe of a locomotive and rolling stock, which is installed on both ends of the main brake pipe of the locomotive and rolling stock and mounted with a brake hose. A connector with a seal rubber ring at the other end of the brake hose is used to connect the locomotive and the rolling stock or interconnect the rolling stocks. During the work of train dismantling, train formation or train maintenance and replacement of the seal ring of the connector, the air path between the main brake pipe and the brake hose need to be frequently switched on and off by means of the angle cock. Closing of the angle cock due to work requirements is defined as "Normal Closing", while closing of it (or half-closed state) strictly prohibited during the whole running period after train formation is defined as "abnormal closing". Once the abnormal closing of angle cock occurs, the train brake cannot be controlled by the driver, which could lead to serious accidents such as train collision, brake defect and capsizal. A technique which prevents from abnormal closing of angle cock is called "Anti-closing Technology". Main factors causing abnormal closing of angle cock are categorized into the following four kinds: 1. entangling of rope and of the cloth tent cause the handle move which result in the cock core to be in the half-closed or in full-closed state; 2. climbing of the train by the escorts and wanderers as well as random switching lead to the half-closed or full-closed state; 3. man-made mistakes sometimes cause angle cock fully closed; 4. carelessness of the inspectors leads to the two adjacent angle cocks double-closed, single-closed or half-closed.

In order to avoid damages triggered by abnormal closing, board studies have been done on "Anti-closing Technology" both at home and abroad. Integrated analysis shows that all the research schemes can be basically divided into three kinds. The first scheme is to install a locking spring at the handle's top or adopting method of compression locking based on the traditional angle cock, or at most cases improve the air bleed brake. The above-mentioned schemes adopt a traditional method of switching to-and-fro within 90° range at close or open state or directly bleeding pressure air to the atmosphere, which fails to achieve objective of the expected design. The angle cock can only preset unified and fixed air bleed capacity only when manufactured. Obviously, any fixed air bleed capacity set in all the traditional design schemes fails to meet the requirements of different air bleed capacity of front, middle and rear cars of the train and technical requirements of different positions like front or rear part of train. A technological difficulty of greater attenuation value occurs during the inverted transmission of a brake wave and an air wave under the state of supplemented wind pressure at the front-end of the train, which makes it hard to realize the long-distance transmission. When faced with this technological difficulty, people solve it by treating it as a problem of insufficient air bleed capacity. Moreover, in accordance with theory of "when implementing air brake, the cross-section area of an air bleeding hole of the angle cock must be equal to or greater than that of locomotive air intake hole", there is a plurality of research schemes on "great air bleed capacity". After searching among Chinese patents, a Chinese Patent CN93214462.4 with a title of "Angle Cock with Double Ball-shaped Cores" fails to solve a problem in schemes of "great air bleed capacity", that is, when closing angle cock, the pressure will be inevitably bled so that the angle cock is out of control, which imposes difficulties on routine work. The reason is as follows: under the condition of normal opening, the cock must be opened slowly to avoid the problem that high-pressure gas at one end of cock rushes to the other end with low-pressure gas and results in breaching of limits of pressure drop. All those "great air bleed capacity" schemes adopt traditional method of to-and fro switching within 90° range to switch on/off the angle cock. It will inevitably trigger sensible parts of train brake system when opening and finally result in bleeding pressure air in brake main pipe of the whole train including locomotive, which will seriously influence punctual departure of the train. The inventor of the present application used to have an invention patent No. CN96115748.8 with a title of "Anti-closing Unidirectional Linked Angle Cock", anti-closing measure of which is to adopt great air bleed capacity to bleed air at one end of the hose to achieve air brake. The results of research show that when bleeding pressure air at one end of hose, brake wave still cannot be transmitted to cars near locomotive by following direction inverted with that of air wave even with increased air bleed capacity. Prior to enforcement of service brake on remote cars and locomotives by brake wave, the pressure drop near the closed angle cock has broken the maximum limit of service brake, and triggered unconventional brake to bleed pressure of brake main pipe rapidly, which causes great difficulties to routine work and seriously influences punctual departure of the train. This measure not only fails to automatically get rid of influences of entangling of rope and tent cloth as well as climbing by wanderer and escort, also doesn't conduct research or take any preventive measures towards accidents caused by carelessness of maintainers. In the latter Chinese invention patent, the solution for slowly opening of angle cock under normal operation as well as that for the problem that pressure of the brake main pipe is bled to 0 MPa when the air bleed for the second time triggers unconventional brake during maintaining work are not investigated. In this case, the angle cock provided by the latter invention patent fails to achieve technological standard for application.

The second kind of scheme is to install mechanical locking or pressure locking facilities on rolling stocks. But, it's needed to refit the existing rolling stocks, and the evaluation and forecast of preventive effects are not proved to be ideal, so the second kind of scheme is not applicable in practice. The third kind of scheme is to provide various kinds of electronic monitoring devices, but with low reliability, delayed alarming and as well as the problems of service life, economic benefits, maintenance and management. With continue improvement of air-tightness at train brake system, delayed alarm is becoming more serious. Even an alarm signal is sent out, serious consequence could not be fully avoided. Also it is hard to fight against intended damages, particularly prosecuted by the internal staff. It is unrealistic and against economic principle of tracing and monitoring the whole operational proceeding of the running train just for the purpose of preventing chance of accident, which could result in the huge waste of money and resources.

SUMMARY OF THE INVENTION

The object of this invention is to overcome the defects on the above-mentioned anti-closing technical solutions and provide unidirectional revolving multi-mode air bleeding safety angle cock with high safety and reliability of anti-closing performance.

In order to solve the above-mentioned technical problems, the technical solution adopted by this invention is as follows. A safety angle cock air-bleeding in a multi-mode and having a ball core revolved in a single direction includes a cock body with a casing, a shaft, a main pipe joint and a hose joint with a locking nose, wherein there is on a upper part of the casing of the cock body a limit stop with a handle mount, a pallet and a ratchet wheel are disposed in the handle mount for controlling rotation of the shaft in a single direction, a small sealing ring is arranged at a hose connection port of the cock body and a large sealing ring at a main pipe connection port of the cock body, and the ball core positioned in the cock body is connected to the lower end of the shaft and provided with a air bleeding slot on each side thereof, the length of the slot being bigger than the diameter of the small sealing ring and smaller than the diameter of the big sealing ring, characterized in that an air bleeding valve for adjusting and controlling air-bleed is mounted at a bottom of the casing of the cock body.

The casing of the cock body and the main pipe joint are connected with each other by bolts or by threaded parts. The casing of the cock body and the hose joint can be fixed with bolt or be integrally formed together. A lower end of the shaft is installed in a driving groove at the upper part of the cock ball core.

In the safety angle cock, the air bleeding valve includes a revolving vane for adjusting and controlling air bleed with a driving plectrum fitted in a driving groove that is disposed at a bottom of the ball core.

In the safety angle cock, the air bleeding valve further includes an air bleeding seat for adjusting and controlling air bleed, an air bleeding pad for adjusting and controlling air bleed and an air bleeding protection cover plate, all of them being mounted in sequence at the bottom of the casing of the cock body.

In the safety angle cock, air bleeding holes in different sizes are provided on the revolving vane and correspond to air bleeding holes provided on the air bleeding seat and the air bleeding pad.

In the safety angle cock, there are on the lower part of the air bleeding protection cover plate a plurality of air bleeding holes staggered with the air bleeding holes of the air bleeding pad and surrounded with a plurality of air bleeding channels.

In the safety angle cock, the handle mount is mounted with a movable handle having a socket that corresponds to the locking nose.

In the safety angle cock, the locking nose is provided with a split pin hole and a stop fin socket.

In the safety angle cock, the pallet is not provided with restoring spring.

In the safety angle cock, a top cover is fixedly mounted at an upper end of the rotation shaft.

In the safety angle cock, a bidirectional arrow is located on an upper surface of the top cover and a display screen is arranged on each of two sides of the top cover. The bidirectional arrow indicates an on or off state, and an engineering grade red reflective film is fixed or a red micro-bead reflective paint is coated on the display screen.

A small-sized spring is installed at the center of the revolving vane so that the spring is always kept contacting with an upper plane of the air bleeding seat. At different positions on the rotary plane of the revolving vane, main air bleeding holes, auxiliary air bleeding holes and a micro air bleeding hole are provided, for example one main air bleeding hole and one auxiliary air bleeding hole, or two main air bleeding holes arranged symmetrically and two auxiliary air bleeding hole also arranged symmetrically. Both large air bleeding holes and small air bleeding holes are provided on the air bleeding seat and the air bleeding pad respectively. The large air bleeding holes can be communicated in turn with the main and auxiliary air bleeding holes of the revolving vane during the revolving motion. The small air bleeding hole is provided at the center of a concave stand situated at the center of air bleeding seat and is also provided at the center of the air bleeding pad. The small air bleeding hole in the air bleeding pad is a little bit larger than that in the air bleeding seat. Radius of the concave stand situated at the center of the air bleeding seat is, to some extent, a little bit larger than that between edge of the main air bleeding hole and center point on the revolving vane. The air bleeding protection cover plate of air bleeding valve is installed on the bottom plane of the casing of the cock body by bolt connection or riveted connection. Many supporting points and mutually communicated air bleeding passages are provided on the inner plane of the air bleeding protection cover plate. After assembling, a cavity is formed between the air bleeding protection cover plate and the air bleeding pad. A plurality of air bleeding holes with different sizes and being staggered with the large and small air bleeding holes on the air bleeding pad are provided in the cavity. Outside of the cavity are a plurality of air bleeding passages staggered and communicated with each other, wherein a chain can be pressed into one or two of these air bleeding passages and hanged from it/them. The Stop fin is connected with the other end of the chain. Thickness of the stop fin is a little bit smaller than the open size of the stop fin socket on the locking nose. The width of upper beam of the stop fin is larger than hatch size of the stop fin socket, but a little bit smaller than diameter of the stop fin sockets.

Technological Outlines of this Invention: ratchet mechanism is designed so that the angle cock is opened or closed by push-pulling the movable handle twice or even more times (the following example takes the setting of twice push-pull as example). For setting of push-pulling the movable handle twice, the stopper makes the movable handle only to-and-fro idle within a range of 45°. Only by pushing to 50°, the right and left stopper can prop the pallet into the engaging teeth of the ratchet wheel. Thereby, the movable handle drives the ratchet wheel mechanism, which in turn drives the shaft and the cock ball together with the revolving vane to have synchronized unidirectional rotation of only 45° each time. When the movable handle moves again, the ratchet wheel teeth props the pallet up to resume the idling state of the movable handle. After rotating 45° at the first time for closing the angle cock, the cock ball core is half-closed such that the main passage and the air slots at both sides ride obliquely on the large and small seal rings. In this case, a part of pressure air at two ends of the angle cock enters into the cock body cavity through the air slots at both sides; a part of it enters into the cock body cavity by passing by the edges of the large and small seal rings; and a part of it enters into the angle cock body cavity along the edges of the main passage after being mixed in the main passage. This bidirectional air bleeding method, adopted for the first time, enables pressure air within the main brake pipe on cars at rear part of the train to have characteristics of complementary wind pressure from locomotive no matter the angle cock is at front or rear part of the train, which not only thoroughly solves contradiction between complementary wind pressure and capacity pressure, but also effectively reduces the difference between peak value of the pressure drop at front part of the train and that at rear part of the train. Thanks to damping effect of the air bleeding valve, pressure air at both ends continue the mixture process and finally achieve equilibrium within cavity of the cock body, which further reduces pressure difference at two ends of cock. Experiments prove that the method of bidirectional air bleeding and mixture balancing pressure effectively changes pressure transmission curve, which is featured by occurrence of great attenuation value when the brake wave and the air wave are transmitted inversely. It solves a technological difficulty that inverted transmission is hard for long-distance steady transmission. The achieved relatively flat pressure curve can enable the brake wave to be steadily transmitted to the furthest end of the train including locomotive, which thoroughly eliminate differences of requirements imposed by different cars at front, middle and rear part of the train on air bleeding brake, thus enabling any one of angle cocks to be adaptable to working requirements of different position and cars. At this time, the main air bleeding hole in the revolving vane is correspondingly communicated with the large air bleeding hole in the air bleeding seat, which can moderately bleed the balanced and mixed pressure air to the atmosphere with sharp sound. Adjusting and setting the diameter of the main air bleeding hole in the revolving vane and the air bleed capacity of the micro air bleeding hole at the center can help to get the optimal air bleed capacity of bidirectional air bleed, and to realize steady and reliable pressure-maintaining service brake of the whole train. After rotating 45° at the second time, the main passage of the cock core is closed. Thereby, the air slot at the right side is completely sealed by large seal ring so that the brake main pipe of the train is completely blocked. The air slot at the left side of the cock core bestrides on small seal ring so that pressure air at hose end is entered into the cavity of the cock body. At this time, the auxiliary air bleeding hole in the revolving vane is correspondingly communicated with the large air bleeding hole in the air bleeding seat so that the pressure air at hose end is moderately discharged to atmosphere. Furthermore, a small amount of pressure air is emitted from a gap between the main air bleeding hole in the revolving vane and the concave stand at the center of the air bleeding seat as well as the run-through micro air bleeding holes at the center. Therefore, the optimal air bleed capacity of unidirectional air bleed can be acquired by adjusting and setting the diameter of the auxiliary air bleeding hole in the revolving vane and the diameter of the small air bleeding hole at the center of the concave stand on the air bleeding seat. Under the conditions of without resuming normal opening and without release of brake of cars at rear part of the train, dismantling work without pressure can be completed by successively closing the angle cock between adjacent cars. After rotating again, cock is opened and the auxiliary air bleeding hole in the revolving vane is blocked by the air bleeding seat so as to prevent the pressure air from being discharge to atmosphere, thus fully meeting requirements of slowly opening. Prior to full opening of a pair of angle cocks on adjacent cars, rear part of the train cannot be charged and released, and a micro air bleeding hole at center of the revolving vane and the gap between the main air bleeding hole in the revolving vane and the concave stand in the air bleeding seat in at least one angle cock can discharge a certain amount of pressure air through the small air bleeding hole at the center of the concave stand in the air bleeding seat. At the same time, it will send out an alarming sound to remind worker of fully opening two angle cocks, which can effectively avoid accidents of single opening or half opening due to carelessness. The reason for adopting three points including the micro air bleeding hole at the center of rotary vane and two alternative gaps for air bleed is to prevent air bleed from being hindered due to micro particles or oil stain in the air path. The optimal air bleed capacity of the air bleed for prompt voice in opening operation mode can be acquired by adjusting and setting diameter of the small air bleeding hole at the center of the concave stand in the air bleeding seat. After full opening of two adjacent cocks, large and small seal rings will have the effect of air tightness on main passage of the ball-shaped cock core. At this time, the air bleeding valve bleeds the remaining pressure air within the cavity of the cock body to prevent parts except the main passage from bearing any ineffective pressure. An air bleeding protection cover plate is installed at the outmost side of the air bleeding valve so as to avoid the air bleeding holes are blocked due to man-made behaviors.

Compared with the prior art, this invention has beneficial effects as follows. By plugging the stop fin of the angle cock into the locking nose and then allowing it to reverse downwards naturally, the movable handle can be locked to avoid its accidental bending upward. The protective method of performing double-locking on the stop fin and the movable handle by plugging the split fin into the locking nose can replace the conventional method of binding the cock handle by two iron wires, and is safer and can reduce material consumption. If the stop fin and the split pin are not plugged in, the movable handle will bend upward when influenced by abnormal outer force. In this case, if the movable handle rotates toward outside of car, it will meet the rotation stop point; and if it rotates toward inside within a range of 45°, it will idle. Thus, the cock core will not rotate at operating modes, which will automatically be free from two kinds of abnormal factors including entangling of rope or tent cloth as well as climbing or stepping of wanderers and escort. This method will safeguard running safety on the one hand and alleviate workload for working staff on inspections and resuming the angle cock to normal operating modes on the other hand.

This invention can conduct all-round automatic supervision and prevention on the operating modes of the angle cock, such as all-opened, half-closed, all-closed, half-opened, all-opened operating modes. When man-made damages occur, even if the stop fin is pulled out and the movable handle is pushed to 50° according to operational instructions, since each pulling is limited within the range of 45°, the cock core stays at the state of half-closed and bi-directional air bleed. At this time, the pressure gauge on the locomotive will immediately show this information to train crewmember, and then locomotive and rolling stocks immediately perform automatic pressure-maintaining service brake, and thereby the train cannot start. At the same time, the angle cock will continuously send alarming sound to guide working staff to go to the field to catch destroyer by following the alarming sound instead of searching cars one by one, and thereby punctual departure of the train will be guaranteed. If the destroyer continues to fully close the cock, since the cock core has been at the fully-closed and unidirectional air bleed state, the rear part of the train has performed automatically brake and cannot be charged to release without being resumed to normal operating modes. Thus, the train cannot start, and damaging purpose still fails. In addition, continuous alarming sound will force the destroyer to escape as soon as possible. If the destroyers closes the pair of cocks between the adjacent cars at the same time, they will also fail because the set sum of air bleed capacity of the two cocks breaks the regulated pressure drop rate (10~40 Pa/S), which inevitably trigger the chain reaction of unconventional brake, and the whole train including the locomotive will immediately implement the automatic unconventional brake. The automatic instant protection method can also make the destroy behavior of disassembling trains in running fail, because the prompt voice for the air bleed operating mode before full opening situation, the bi-directional air bleed operating mode in half-closed situation, unidirectional air bleed operating mode in full-closed situation can not be omitted under any condition. As for other damages caused by varied abnormal elements, further protection is also realized without further providing protection facilities and fees, which provides economic and reliable technical guarantee for the safety of train operation.

The invention can also improve greatly the safety operation level of the normal operation. When dismantling the train or checking hose joint to change the sealing ring, the pair of angle cocks in adjacent cars shall be closed successively before dismantling the connector. While the half-closed bi-directional air bleeding condition automatically realizes the pressure-maintaining brake of the whole train, the locomotive pressure gauge clearly shows "pressure-maintaining brake", reminding the locomotive crew to protect the safety of operators. When the pair of angle cocks is closed, the pressure air within the hose is bled automatically to reduce effectively the working intensity of dismantling the connector and to avoid harming people due to the rebounding of the bled pressure. Meanwhile, the front part of the train immediately resumes to the normal pressure and releases due to the air compensation of the locomotive, but the end part of the train can not release without the air compensation, so the train still cannot start, which can effectively avoid the harm to maintenance workers due to the unexpected startup of the train. After the dismantling operation, the "runaway" of dismantled fleet can be avoided because it is under the pressure-maintaining brake condition. Because the invention realizes the automatic pressure-maintaining brake on the angle cock, it can resume immediately the normal pressure and release automatically once the normal operating mode is resumed, and thereby no difficulties or negative effect will be caused against the normal operation and punctual departure of the train.

The invention adopts the method of 360° unidirectional revolving, expanding the to-and-fro revolving operation range from within 90° to within 180° so that many functions or control measures can be equipped within the double range. The repeated settings within the corresponding 180° range can not only enhance the reliability of varied functions, but also reduce effectively the volume and weight of the product. The weight of the test angle cock of the invention, compared with the traditional tapered angle cock, is reduced by 35% or more, and that of the test angle cock special for the passenger train is reduced by 50% or more, lowering manufacture cost significantly. At the same time, there are not quick-wear parts and sealing rings of self-lubricating material (e.g. polytetrafluoroethylene or modified polytetrafluoroethylene), which can not only avoid the conventional maintenance and regular coating of 295 silicone grease but also eliminate the "blocked" defect of the normal ball angle cock, thereby lowering effectively the maintenance charges. The position and operation range of the movable handle designed in the invention is more suitable for human activities than that in any angle cock in the prior art, which can be operated with both hands, reducing the working intensity greatly.

BRIEF DESCRIPTION OF DRAWINGS

The following are detailed descriptions of the invention with attached drawings and embodiment modes.

Figure 1:
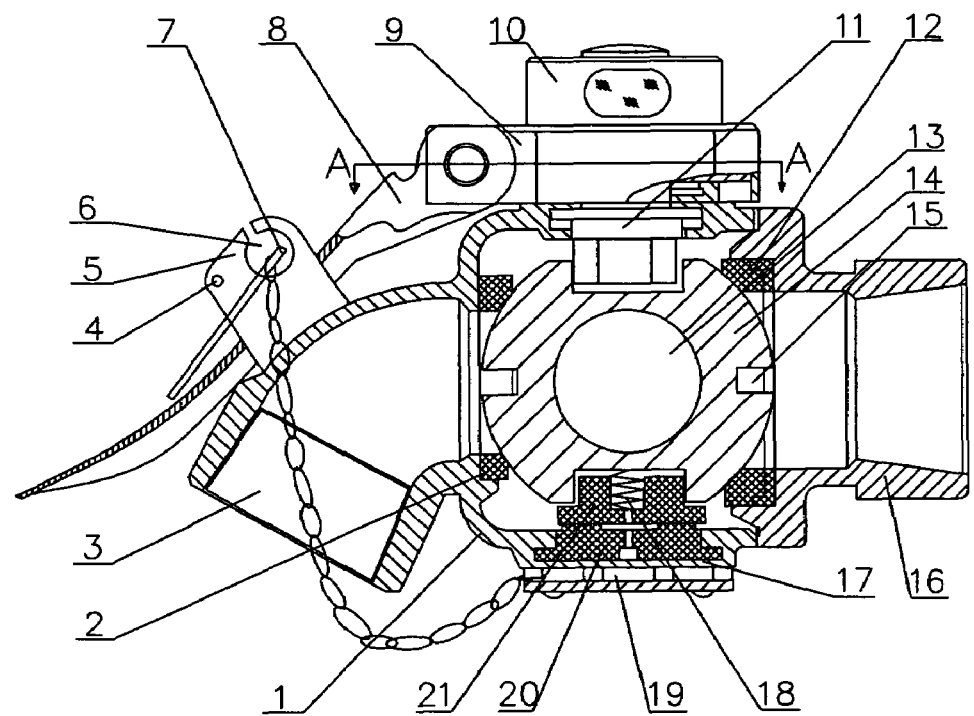
FIG. 1 is the schematic view for illustrating the structure of an angle cock according to an embodiment of the invention.
Figure 2:
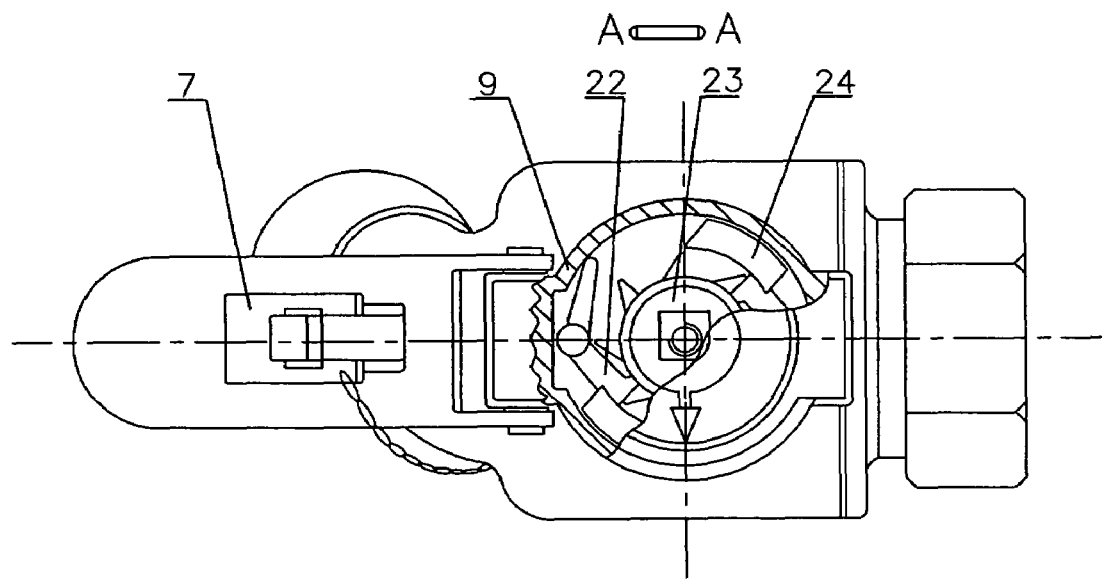
FIG. 2 is a view taken along line A-A in FIG. 1.
Figure 3:
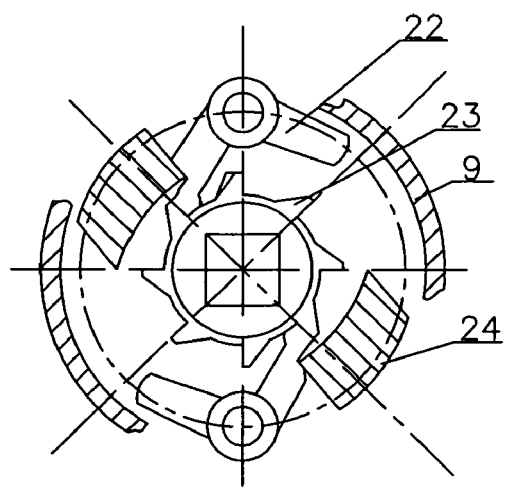
FIG. 3 is a schematic view for illustrating the operating mode of a ratchet mechanism while the movable handle is stopped according to the embodiment of the invention.
Figure 4:
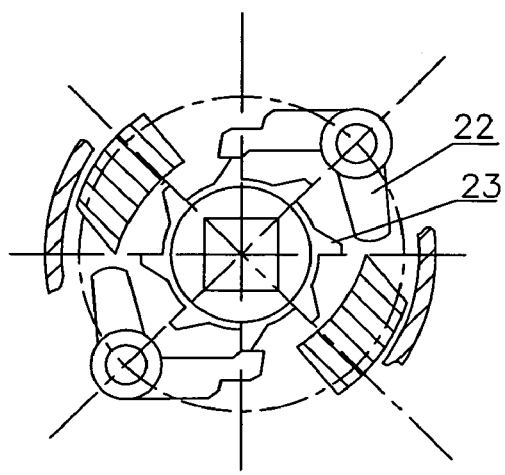
FIG. 4 is a schematic view for illustrating the operating mode of the ratchet mechanism when the pallet is idling within the range of 45° (including 45°) according to the embodiment of the invention.
Figure 5:
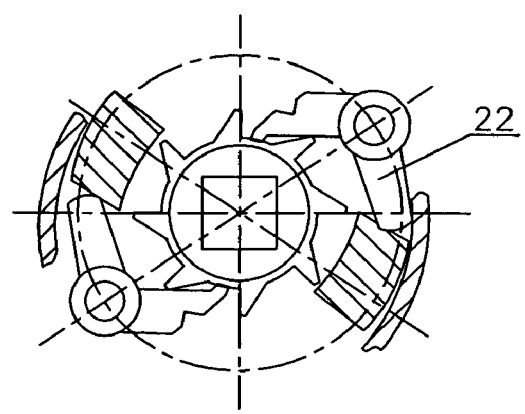
FIG. 5 is a schematic view for illustrating the operating mode of the ratchet mechanism when the stopper pushes the pallet into the engagement tooth if the pallet rotates beyond a range of 50° according to the embodiment of the invention.
Figure 6:
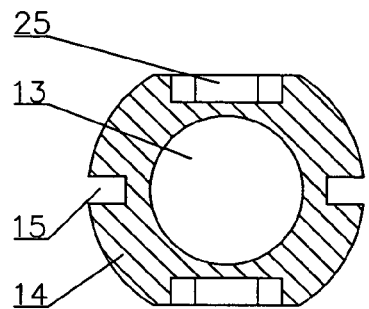
FIG. 6 is a front view of a ball core of the cock according to the embodiment of the invention.
Figure 7:
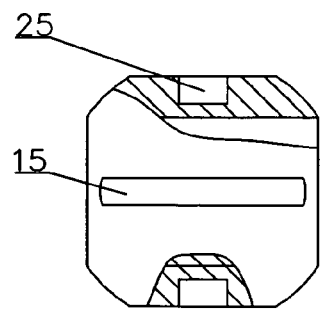
FIG. 7 is a left view of the ball core according to the embodiment of the invention.
Figure 8:
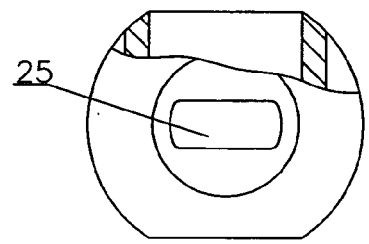
FIG. 8 is a top view of the ball core according to the embodiment of the invention.
Figure 9:
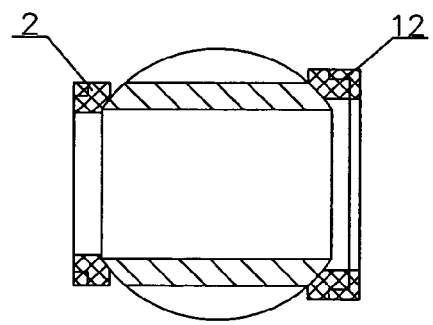
FIG. 9 is a schematic view for illustrating the operating mode of the opening position according to the embodiment of the invention.
Figure 10:
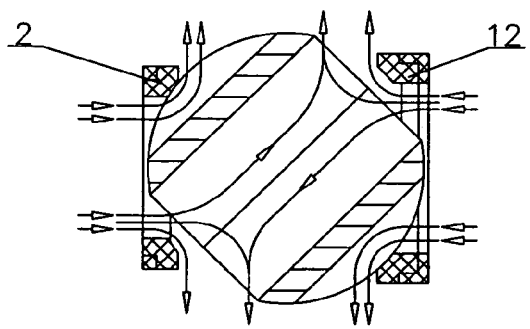
FIG. 10 is a schematic view for illustrating the operating mode of the bidirectional air bleed of half-closed position according to the embodiment of the invention.
Figure 11:
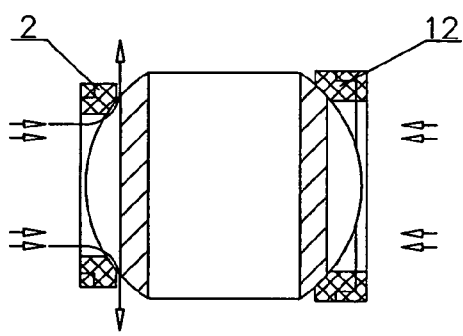
FIG. 11 is a schematic view for illustrating the operating mode of the unidirectional air bleed of the full-closed position according to the embodiment of the invention.
Figure 12:
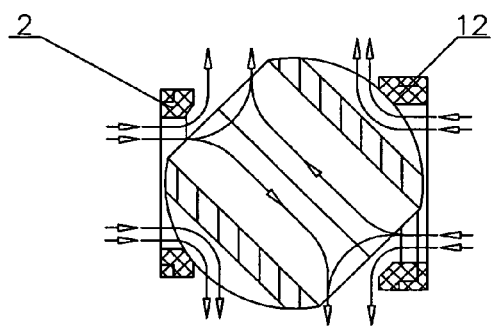
FIG. 12 is a schematic view for illustrating the operating mode of the prompt voice micro air bleed of the half-opened position according to the embodiment of the invention.
Figure 13:
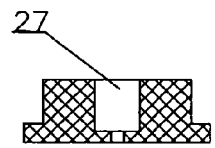
FIG. 13 is a front view of a revolving vane for adjusting and controlling air bleed according to the embodiment of the invention.
Figure 14:
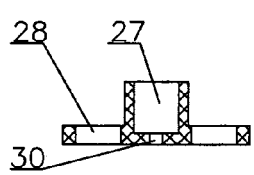
FIG. 14 is a left view of the revolving vane for adjusting and controlling air bleed according to the embodiment of the invention.
Figure 15:
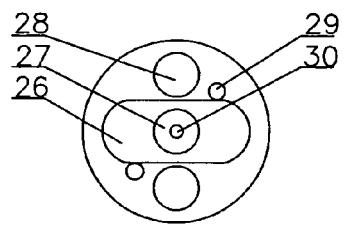
FIG. 15 is a top view of the revolving vane for adjusting and controlling air bleed according to the embodiment of the invention.
Figure 16:
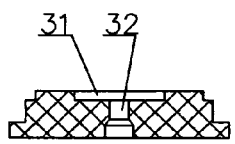
FIG. 16 is a front view of an air bleeding rubber seat for adjusting and controlling air bleed according to the embodiment of the invention.
Figure 17:
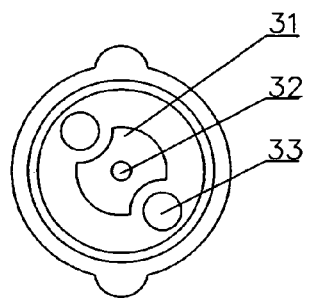
FIG. 17 is a top view of the air bleeding rubber seat for adjusting and controlling air bleed according to the embodiment of the invention.
Figure 18:
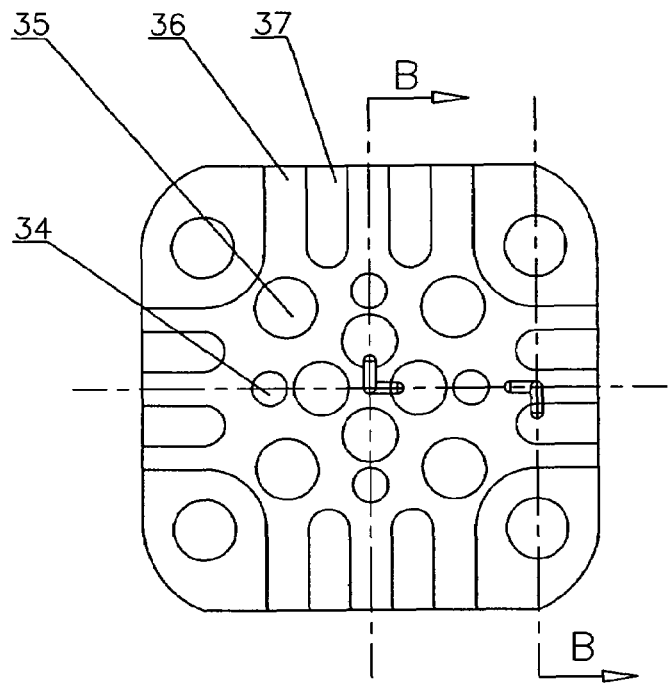
FIG. 18 is a top view of the air bleeding protection cover plate according to the embodiment of the invention.
Figure 19:
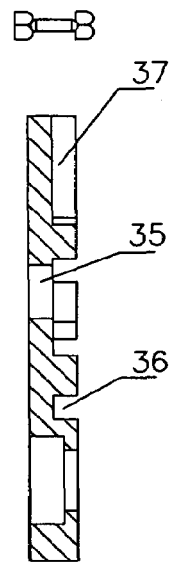
FIG. 19 is a view taken along line B-B in FIG. 18.
Figure 20:
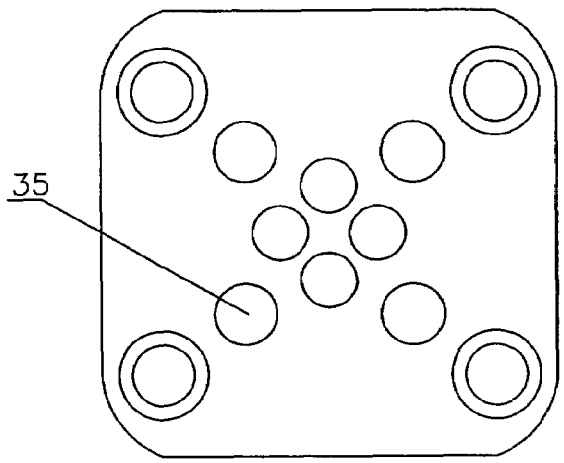
FIG. 20 is a bottom view of the air bleeding protection cover plate according to the embodiment of the invention.

wherein the reference numerals are as follows:

1 cock body; 2 small sealing ring; 3 hose joint; 4 pin hole; 5 locking nose;

6 stop fin socket; 7 stop fin; 8 movable handle; 9 handle mount;

10 top cover; 11 shaft; 12 large sealing ring; 13 main passage;

14 ball core of the cock; 15 air bleeding slot; 16 main pipe joint;

17 air bleeding pad for adjusting and controlling air bleed; 18 spring;

19 air bleeding protection cover plate;

20 air bleeding seat for adjusting and controlling air bleed;

21 revolving vane for adjusting and controlling air bleed;

22 pallet; 23 ratchet wheel; 24 stopper; 25 driving groove;

26 driving plectrum; 27 spring hole; 28 main air bleeding hole;

29 auxiliary air bleeding hole; 30 micro air bleeding hole;

31 concave stand; 32 small air bleeding hole;

33 large air bleeding hole; 34 protruding stand;

35 air bleeding hole; 36 air bleeding channel; 37 protruding rib.

A movable handle 8 which can be lifted, pushed, pulled and turned is hingedly connected with a casing of a handle mount 9 and provided with an insertion opening corresponding to a locking nose 5. The movable handle 8 can be turned upwards to be vertical when an external force is applied to the movable handle 8. While stopping turning the handle 8, it drops and inserts into the locking nose 5, and a stop fin 7 is then plugged into a stop fin socket 6 of the locking nose 5 and turned down by its own weight so that the movable handle 8 is locked on the locking nose 5 to avoid the movable handle 8 bending upwards accidentally. Pallets 22 and a ratchet wheel 23 are installed within the casing of the handle mount 9. Since the pallet 22 is not provided with a spring which make the pallet 22 engage automatically with the ratchet wheel 23, after the pallet 22 rotates from a stopping point and then is propped up by the ratchet wheel 23, the pallet 22 can not automatically engaged with the ratchet wheel 23 and can only idle within the set range in order to preventing the angle cock from being closed. If the movable handle 8 is set to complete the closing of the angle cock after being pulled twice, the ratchet wheel 23 is provided with 8 teeth on the circumference thereof at regular intervals. If the movable handle 8 is set to complete the closing of the angle cock after being pulled three times, the ratchet wheel 23 is provided with 12 teeth on the circumference thereof at regular intervals. The stopper 24 in the upper part of a casing of cock body 1 protrudes into the casing of the handle mount 9 at the same level with pallet 22. One end of stopper 24 defines the stopping point of pallet 22, and the other end of stopper 24 is at a predetermined position so that the pallet 22 is against the engagement tooth of the ratchet wheel 23 at a set angle when the pallet 22 moves to this position, so as to allow the pallet 22 operate normally. A top cover 10 is fixed on the upper portion of the ratchet wheel 23 and rotates with it so that the casing of handle mount 9 is limited to rotate around the ratchet wheel 23 only at the same level with ratchet wheel 23. An arrow indicating "open" or "close" is disposed on an upper plane of top cover 10, and two opposed small display screens are set on the side of the top cover 10. A Red engineering grade reflective film can be fixed on the display screen, or red micro-bead reflective paint or other red reflective material can be coated thereon for check and operation at night.

A shaft 11 is installed at a bottom of the ratchet wheel 23 and rotates with it synchronously, and the lower end of the shaft 11 is mounted in a driving groove 25 which is disposed on the upper part of a ball core 14 of the cock so as to rotate with the ball core 14 synchronously. A hose connection port for installing a train brake hose is fixed on the left side of the casing of cock body 1 by bolts or integrally formed thereon. The locking nose 5 is above outside of the hose connection port, and provided with a stop fin socket 6 and a pin hole 4 for locking the movable handle 8 and keeping it from bending upwards accidentally. A small sealing ring 2 is installed on the inner side of the hose connection port, whose seal diameter is smaller than the length of air slots 15 on the both sides of the ball core 14. A main pipe connection port is disposed on the right side of the casing of cock body 1 by bolt connection or screwed connection. A Large sealing ring 12 is installed on the inner side of the main pipe connection port, whose seal diameter is larger than the length of air slots 15 on the both sides of the ball core 14. A Main passage 13 is in the middle of the ball core 14, and the length of the air slot 15 set on each side of the ball core 14 is longer than the seal diameter of the small sealing ring 2 and shorter than that of the large sealing ring 12. As a result, when at a full-opened position, the large sealing ring 12 and small sealing ring 2 can guarantee the air tightness at the both ends of the main passage 13 of the ball core 14 to make the pressure air within the main passage 13 not leak. When in a bidirectional air bleed operating mode at a half-closed position, main passage 13 and air slot 15 at the both sides span the large sealing ring 12 and small sealing ring 2 at an angle to push the pressure air at the both sides of the cock into the cavity of the casing of cock body 1 to achieve balance. Then, the air will be moderately discharged to atmosphere through the air bleeding valve to realize the automatic pressure-maintaining brake of the whole train including the locomotive. When in a unidirectional air bleed operating mode at a full-closed position, the main passage 13 revolves to the cut-off vent condition. In this condition, since the right-side air slot 15 is shorter than the seal diameter of the large sealing ring 12, it is sealed by the large sealing ring 12 so as to close train brake main pipe. Simultaneously, since the left-side slot 15 is longer than the seal diameter of the small sealing ring 2, it spans the small sealing ring 2 so that the pressure air is moderately discharged to atmosphere through the cavity in the casing of cock body 1 and the air bleeding valve. Therefore, the rear part of the train is still in the maintaining brake condition, and the non-pressure operation between any cars can be realized safely only by closing the adjacent two cocks. Before half-opened position resumes to full-opened position, during the rotation of main passage 13 and air slots 15 while spanning two sealing rings at an angle, as long as full-opened operating mode position has not been reached, air supply can be offered to prompt voice for opened operating mode to avoid the single-opened or half-opened accidents due to carelessness of worker. An upper driving groove 25 on the upper part of the ball core 14 is installed correspondingly with the shaft 11, and a lower driving groove 25 on the lower part of the ball core 14 is installed correspondingly with a revolving vane for adjusting and controlling air bleed 21 (simply referred as "the revolving vane"). On the center of the revolving vane 21, there is a small spring 18 which is always contacted with an upper plane of an air bleeding seat for adjusting and controlling air bleed 20 (simply referred as "the air bleeding seat").

When in bidirectional air bleed operating mode on half-closed position, a main air bleeding hole 28 of the revolving vane 21 is turned to communicate with a large air bleeding hole 33 of the air bleeding seat 20 to discharge the mixed and balanced pressure air in the cavity of the casing of cock body 1 outside from the both ends to the atmosphere. At the same time, because a micro air bleeding hole 30 at the center of the revolving vane 21 is communicated with the small air bleeding hole 32 within a concave stand 31 at the center of the air bleeding seat 20, a small amount of pressure air is also discharged to the atmosphere. The method of mixing and balancing the pressure air at both ends has already improved thoroughly the pressure drop curve of brake wave and air wave in inverted transmission condition. Therefore, the optimal air bleed capacity of the bidirectional air bleed operating mode of each train position and car can be acquired only by adjusting and setting the size of a main air bleeding hole 28 of the revolving vane 21 and the air bleed capacity of the micro air bleeding hole 30 in the center.

When in unidirectional air bleed operating mode on full-closed position, the auxiliary air bleeding hole 29 of the revolving vane 21 revolves to communicate with the large air bleeding hole 33 of the air bleeding seat 20 so as to discharge the pressure air at one end of the hose to the atmosphere. At the same time, the main air bleeding hole 28 of the revolving vane 21 rotates within a rotation range of a gap which is formed between the concave stand 31 at the center of the air bleeding seat 20 and the main air bleeding hole 28. The small air bleeding hole 32 in the concave stand 31 at the center of the air bleeding seat 20 controls the total air bleed capacity of the gap and the micro air bleeding hole 30 at the center of the revolving vane 21. Now, since one end of the main pipe is in closed condition and the rear part of the train cannot release without the complement of air from the locomotive, the optimal air bleed capacity suitable for the non-pressure operation of any car position can be acquired only by adjusting and setting the size of the auxiliary air bleeding hole 29 of the revolving vane 21 and the air bleed capacity of the small air bleeding hole 32 in the concave stand 31 at the center of the air bleeding seat 20.

During the operation process from full-closed position to fully opened position via half-closed position, the auxiliary air bleeding hole 29 of the revolving vane 21 is totally shut out by the air bleeding seat 20 and only two very small gaps are maintained, in which the two gaps are located between the main air bleeding hole 28 and the micro air bleeding hole 30 at the center of the revolving vane 21 and the concave stand 31 at the center of the air bleeding seat 20. A small amount of pressure air can be discharged via the small air bleeding hole 32 in the concave stand 31 at the center of the air bleeding seat 20. Therefore, the optimal air bleed capacity of prompt voice for open operating mode can be acquired only by adjusting and setting the size of the small air bleeding hole 32 in the concave stand 31 at the center of the air bleeding seat 20. The aim of maintaining two micro gaps between the main air bleeding hole 28 and the micro air bleeding hole 30 at the center of the revolving vane 21 and the concave stand 31 at the center of the air bleeding seat 20, total of three air bleeding points, and bleeding air via the small air bleeding hole 32 in concave stand 31 at the center of the air bleeding seat 20 is to prevent the ventilation from being obstructed due to the blockage of small grains and oil sludge. The micro air bleeding hole 30 of the revolving vane 21 is provided at the center of driving plectrum 26 within the lower driving groove 25 at the lower part of the ball core 14 so that the influence of small grains and oil sludge can be avoided. Although the reserved two gaps are very small, they are often in the rotation motion. Therefore, whenever the main air bleeding hole 28 is communicated with the large air bleeding hole 33 of the air bleeding seat 20, the oil/water and waste in the train brake pipe can be automatically discharged outside of the cock body. Any small grains, oil, water and waste entering into the small air bleeding hole 32 in the concave stand 31 at the center of the air bleeding seat 20 via the small gaps and micro air bleeding hole will not result in the blockage, guaranteeing the smooth exhausting.

During the operation process from the full-closed position to full-opened position via half-opened position, both the main passage 13 and the air bleeding slots 15 of the cock plunger ball core 14 are rotating in the state of spanning the sealing rings at the two ports. Although the maximum ventilation cross-section is more than 600 mm$^2$, only few pressure air is used as the air supply for the "prompt voice for opening operating mode" to be discharged to the atmosphere due to the adjustment and control action of the air bleeding valve. Therefore, the angle cock can fully meet the requirement of gradually opening a train brake system, and the abnormal brake due to the triggering of the second air bleed won't occur under the condition of normal pressure-maintaining brake during the check and maintenance operation, to thereby guarantee the punctual departure of the train.

An air bleeding protection cover plate 19 with a plurality of holes and channels and an air bleeding pad for adjusting and controlling air bleed (hereinafter referred as "the air bleeding pad") 17 on the bottom of the casing of cock body 1 form a composite chamber in a central part. Under the lower part of the chamber, there are several air bleeding holes 35 with different diameters, several air bleeding channels 36 staggered and communicated with each other toward the peripheral edges. All holes and channels are staggered with air bleeding holes of different sizes on the air bleeding pad 17, but are communicated with each other in the composite chamber. The method of ventilation by using a plurality of air bleeding holes and channels with different sizes in five directions simultaneously can prevent the destroyers from closing the angle cock by blocking some of the air bleeding holes.

What is claimed is:

1. A safety angle cock air-bleeding in a multi-mode and having a ball core revolved in a single direction includes a cock body with a casing, a shaft, a main pipe joint and a hose joint with a locking nose, wherein there is on a upper part of the casing of the cock body a limit stop with a handle mount, a pallet and a ratchet wheel are disposed in the handle mount for controlling rotation of the shaft in a single direction, a small sealing ring is arranged at a hose connection port of the cock body and a large sealing ring at a main pipe connection port of the cock body, and the ball core positioned in the cock body is connected to the lower end of the shaft and provided with a air bleeding slot on each side thereof, the length of the slot being bigger than the diameter of the small sealing ring and smaller than the diameter of the big sealing ring, characterized in that an air bleeding valve for adjusting and controlling air-bleed is mounted at a bottom of the casing of the cock body, the air bleeding valve including a revolving vane for adjusting and controlling air bleed with a driving plectrum fitted in a driving groove that is disposed at a bottom of the ball core.

2. A safety angle cock according to claim 1, characterized in that the air bleeding valve further includes an air bleeding seat for adjusting and controlling air bleed, an air bleeding pad for adjusting and controlling air bleed and an air bleeding protection cover plate, all of them being mounted in sequence at the bottom of the casing of the cock body.

3. A safety angle cock according to claim 1, characterized in that the air bleeding valve further includes an air bleeding seat for adjusting and controlling air bleed, an air bleeding pad for adjusting and controlling air bleed and an air bleeding protection cover plate, all of them being mounted in sequence at the bottom of the casing of the cock body.

4. A safety angle cock according to claim 2, characterized in that air bleeding holes in different sizes are provided on the revolving vane and correspond to air bleeding holes provided on the air bleeding seat and the air bleeding pad.

5. A safety angle cock according to claim 3, characterized in that air bleeding holes in different sizes are provided on the revolving vane and correspond to air bleeding holes provided on the air bleeding seat and the air bleeding pad.

6. A safety angle cock according to claim 2, characterized in that there are on the lower part of the air bleeding protection cover plate a plurality of air bleeding holes staggered with the air bleeding holes of the air bleeding pad and surrounded with a plurality of air bleeding channels.

7. A safety angle cock according to claim 3, characterized in that there are on the lower part of the air bleeding protection cover plate a plurality of air bleeding holes staggered with the air bleeding holes of the air bleeding pad and surrounded with a plurality of air bleeding channels.

8. A safety angle cock according to claim 1, characterized in that the handle mount is mounted with a movable handle having a socket that corresponds to the locking nose.

9. A safety angle cock according to claim 1, characterized in that the locking nose is provided with a split pin hole and a stop fin socket.

10. A safety angle cock according to claim 8, characterized in that the locking nose is provided with a split pin hole and a stop fin socket.

11. A safety angle cock according to claim 1, characterized in that the pallet is not provided with restoring spring.

12. A safety angle cock according to claim 1, characterized in that a top cover is fixedly mounted at an upper end of the rotation shaft.

13. A safety angle cock according to claim 12, characterized in that a bidirectional arrow is located on an upper surface of the top cover and a display screen is arranged on each of two sides of the top cover.

* * * * *